United States Patent
Hoffmann et al.

(10) Patent No.: US 8,102,095 B2
(45) Date of Patent: Jan. 24, 2012

(54) ELECTRICAL DIRECT DRIVE FOR A ROLLER

(75) Inventors: Holger Hoffmann, Hessdorf (DE); Stefan Schiele, Stetten (DE); Roland Schultheiss, Erlangen (DE); Wolfgang Wolter, Herbertshausen (DE)

(73) Assignee: Siemens Aktiengesellschaft, München (DE)

( * ) Notice: Subject to any disclaimer, the term of this patent is extended or adjusted under 35 U.S.C. 154(b) by 249 days.

(21) Appl. No.: 12/273,221

(22) Filed: Nov. 18, 2008

(65) Prior Publication Data
US 2009/0127959 A1   May 21, 2009

(30) Foreign Application Priority Data
Nov. 19, 2007   (EP) ..................... 07022398

(51) Int. Cl.
*H02K 1/22* (2006.01)

(52) U.S. Cl. ........................ 310/268; 310/112

(58) Field of Classification Search ......... 310/267–268, 310/112–114
See application file for complete search history.

(56) References Cited

U.S. PATENT DOCUMENTS

| | | | |
|---|---|---|---|
| 5,334,899 A * | 8/1994 | Skybyk | 310/268 |
| 5,498,919 A * | 3/1996 | Bahn | 310/268 |
| 6,137,203 A | 10/2000 | Crain | |
| 6,710,505 B1 * | 3/2004 | Barani et al. | 310/261.1 |
| 2005/0140233 A1 | 6/2005 | Fujioka | |
| 2006/0022552 A1 | 2/2006 | Huang | |
| 2009/0051253 A1 * | 2/2009 | Rettner | 310/40 R |

FOREIGN PATENT DOCUMENTS

| | | |
|---|---|---|
| EP | 1 617 541 A1 | 1/2006 |
| FR | 2 266 971 A1 | 10/1975 |
| WO | WO 01/86781 A1 | 11/2001 |
| WO | WO 2007107416 A1 * | 9/2007 |

* cited by examiner

*Primary Examiner* — Quyen Leung
*Assistant Examiner* — Leda Pham
(74) *Attorney, Agent, or Firm* — Henry M. Feiereisen; Ursula B. Day

(57) ABSTRACT

An electrical roller drive which can be connected to a roller includes a disk-type motor with a secondary part in the form of a disk and with a primary part in the form of a disk.

11 Claims, 2 Drawing Sheets

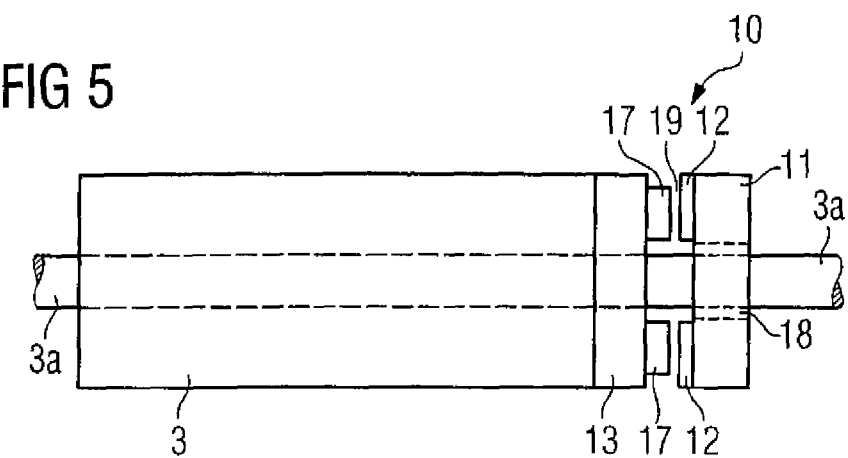
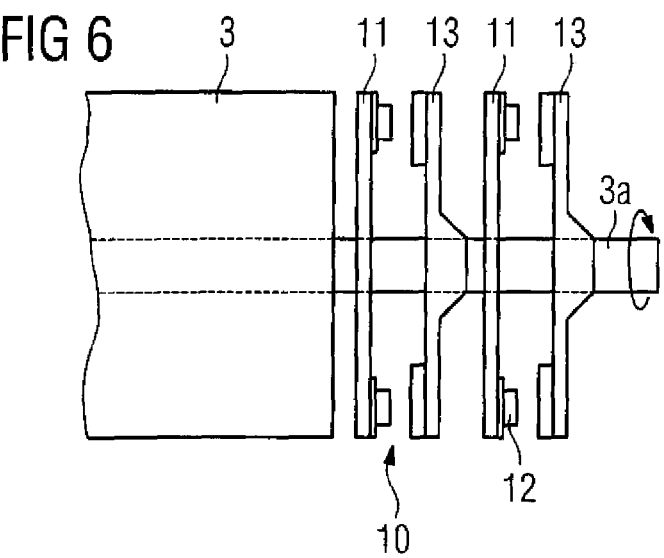
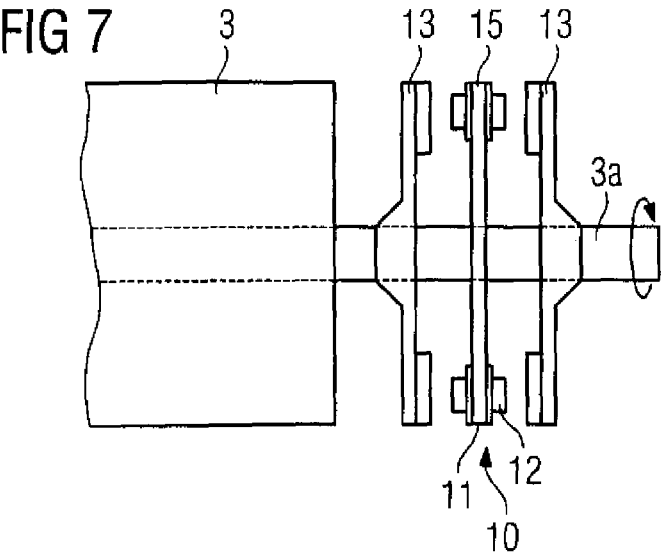

ELECTRICAL DIRECT DRIVE FOR A ROLLER

CROSS-REFERENCES TO RELATED APPLICATIONS

This application claims the priority of European Patent Application, Serial No. EP 07022398, filed Nov. 19, 2007, pursuant to 35 U.S.C. 119(a)-(d), the content of which is incorporated herein by reference in its entirety as if fully set forth herein.

BACKGROUND OF THE INVENTION

The present invention relates to an electrical roller drive, which can be connected to a roller.

Nothing in the following discussion of the state of the art is to be construed as an admission of prior art.

Direct drives with high torques and total power levels at low rotation speeds are required to drive a roller in a production machine, for example a continuous press for wood materials. Currently, inter alia, it is desirable to change over in as simple a form as possible from a present drive variant (drive and gearbox) to direct drive technology. A solution is required for this purpose by means of which the given power range of the production machine under consideration can be achieved without the loss of power steps and machine sizes of the production machine. Direct drives are therefore required which on the one hand do not exceed the space required by the previous solution and on the other hand can be matched as flexibly as possible to the required torque steps of the previous production machines.

Previous concepts for driving a roller in a production machine are based on a design comprising one or more electric motors which transmit the required torques and rotation speeds to the shaft of the roller or to the roller via an intermediate gearbox. The various torques on the roller are made possible by using a variable number of electric motors. The magnitude of the required torques is achieved by means of high rotation-speed/torque step-up ratios of the gearbox. Depending on the required power level, that is to say the required drive torque for the roller, different gearboxes and different electrical drives (electric motors) are used. Drive concepts such as these incur high development costs for special motors which are manufactured specifically from the geometric and power point of view, in the area of direct drive technology and technical complexity, financial cost and time spent in replacement of damaged gearboxes.

It would therefore be desirable and advantageous to provide an improved electrical drive for a roller to obviate prior art shortcomings and to allow easy production at low cost, even in small quantities.

SUMMARY OF THE INVENTION

According to one aspect of the present invention, an electrical roller drive for connection to a roller includes a disk-type motor which includes a primary part in the form of a disk and a secondary part in the form of a disk. This type of disk-type motor is especially applicable for driving a roller of a production machine.

According to another advantageous feature of the present invention, the disk-type motor is constructed in the form of a direct drive for connection to a roller.

According to another advantageous feature of the present invention, the secondary part or the primary part may be arranged directly on the roller. For example, the secondary part may be configured in the form of a rotating component (rotor) and arranged directly on an end face of the cylindrical roller. The primary part in this case may then be constructed in the form of a stator and arranged stationary in opposition to the secondary part. The torque which is produced by the direct drive can thus be transmitted directly to the roller.

According to another advantageous feature of the present invention, the roller has a drive shaft which can be directly connected to the roller, with the secondary part being arranged on the drive shaft of the roller. The secondary part is therefore not arranged directly on the roller itself but on the drive shaft of the roller. This can be beneficial depending on the predetermined installation situation. The associated primary part can be attached in a stationary manner to a machine frame, for the purpose of torque assistance.

A disk-type motor allows variable and precise matching to the torque required for the respective size or power level of the roller or of the production machine. Furthermore, the drive can easily be matched to the available physical space. The variable form of the torque to be emitted can be achieved in various ways with the disk-type motor.

The secondary part preferably may have a plurality of curved or straight secondary part elements. In this case, the secondary part can be designed such that a different number of secondary part elements can be arranged on one basic disk. In this case, a greater or lesser number of secondary part elements may be arranged, depending on the required power. However, the secondary part can also be designed such that the secondary part elements as a whole establish the disk. In this case, the maximum number of secondary part elements can be arranged to form a closed disk, in particular a closed ring, by means of the secondary part elements. Components of standard linear motors can advantageously be used as secondary part elements. This allows a secondary part to be produced easily and at low cost.

Since the secondary part is preferably used as a rotor, the secondary part elements may have a predeterminable number of permanent magnets. Each individual secondary part element may have, for example, three permanent magnets, which, in turn, may be formed from one or more parts. The number of permanent magnets for each secondary part element may hereby be varied depending on the desired power density.

The primary part, which is in the form of a disk, likewise may have a plurality of curved or straight primary part elements, with each primary part element having a single-phase or polyphase winding. The primary part elements may be arranged at a specific distance and angle from one another in an annular or circular shape on a base plate. A greater or lesser number of primary part elements may be arranged depending on the desired power density and desired torque. Each primary part may preferably have a polyphase, in particular three-phase, winding for connection to a three-phase power supply system. The use of straight primary part elements allows advantageously the use of conventional primary parts of standard linear motors, which cost little and a primary part can be produced easily. Curved primary part elements on the other hand offer the advantage that a ring structure or a circular structure can be simulated better.

A primary part in the form of a disk and a secondary part in the form of a disk may be arranged opposite alongside one another in the axial direction and form an air gap which is in the form of a disk or ring. In contrast to conventional electrical machines, in which the electromagnetic fields and forces act in the radial direction, the electromagnetic fields and forces in a disk-type motor are formed in the axial direction.

A disk-type motor offers the advantage that the torque and the power density of the disk-type motor can easily be variably adjusted. On the one hand, the air gap between the secondary part and the primary part, which runs at a right angle to the driven roller, may hereby be formed with a different width. If the air gap is very narrow or small, a greater power and a higher torque can be transmitted. The wider the air gap between the primary part and the secondary part, the less the torque which is transmitted to the roller.

Furthermore, the torque can be adjusted variably by arranging a greater or lesser number of primary part elements and secondary part elements on the primary part and secondary part, respectively.

According to another advantageous feature of the present invention, a plurality of mounting disks, which are flitted with primary and secondary part elements, can also be arranged on the drive shaft of the roller as secondary parts and/or primary parts.

The invention provides for an electrical roller drive to be used for a production machine. In particular, a production machine of this type may involve a continuous press for wood materials. Of course, the electrical roller drive in the form of a disk-type motor is equally applicable for other production machines or facilities with electrical drives.

The use of a disk-type motor in a continuous press for wood materials, or in other production machines, results in advantages over previously used motor-gearbox solutions. Simple matching to the required torque of the production machine is possible in which case, in particular, high-precision matching of the disk-type motor to the required torque can be achieved. Furthermore, a disk-type motor occupies a small area or space, in which case the geometry of the disk-type motor can be optimally matched to the spatial installation conditions of the roller. The described concept also allows a modular design of the direct drive thus avoiding development costs for special motors, which are manufactured specifically geometrically and in terms of power, in the area of direct drive technology. This avoids the costs for maintenance of a gearbox, and avoids mechanical oscillations on the roller resulting from the gearbox. The fitting, the removal and configuration of the drives on the roller of the continuous press are simplified.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows a first refinement of a machine link of an electrical roller drive to a roller, FIG. 6 shows a second refinement of a machine link of an electrical roller drive to a roller, and FIG. 7 shows a third refinement of a machine link of an electrical roller drive to a roller.

DETAILED DESCRIPTION OF PREFERRED EMBODIMENTS

Figure 1:
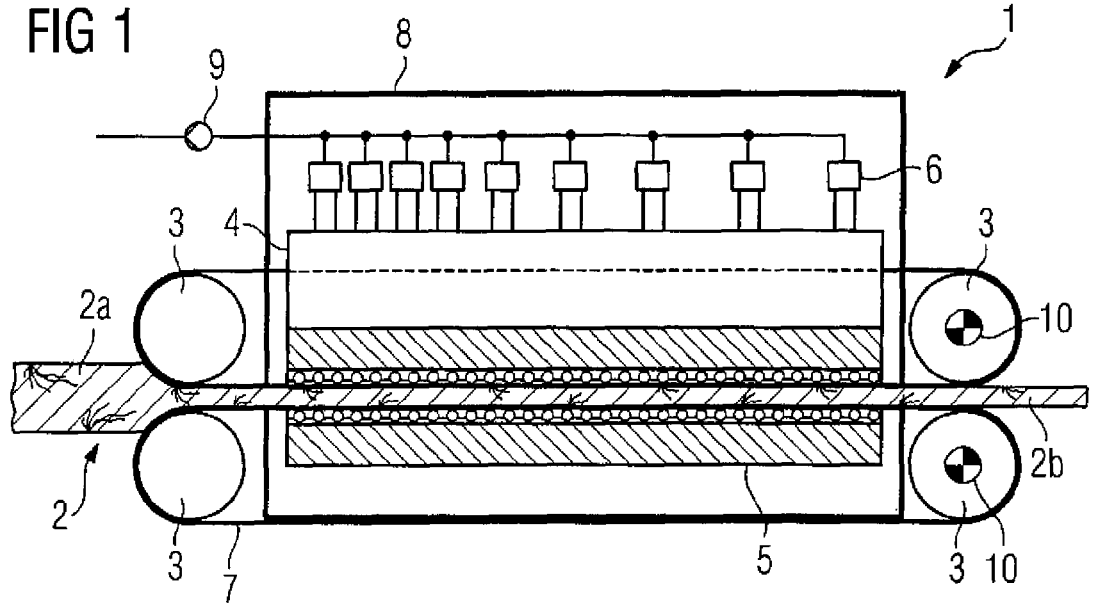
FIG. 1 shows a schematic illustration of a production machine with a roller drive according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a production machine, generally designated by reference numeral 1 and constructed as a continuous press for wood materials. The production machine 1 has four rollers 3 which operate by continuous or step-by-step pressure forming of the rolled item 2. The rolled item is, in particular, wood, with the reference symbol 2a indicating the rolled material or the workpiece in the initial state. The reference symbol 2b indicates the rolled material as a product in the final state. By way of example, a continuous press such as this for wood materials is used to produce particle boards or woodchip boards.

The pressure plate 4 and the pressure table 5 together with the rollers 3 reshape the rolled material. The pressure plate 4 is driven by the pressure cylinders 6. Pressure cylinders 6 such as these are designed, for example, to be hydraulic or pneumatic. Two of the four rollers 3 are driven by means of electrical roller drives 10, with the torque being transmitted by means of a steel strip 7 to the other two rollers 3. The pressure cylinder 6 is supplied with oil, for example, via a line and a pump 9. A housing 8 is also illustrated, and forms the housing of the production machine 1. The illustration in FIG. 1 is only schematic, which means that only the fundamental principle of a continuous press for wood materials can be seen.

Figure 2:
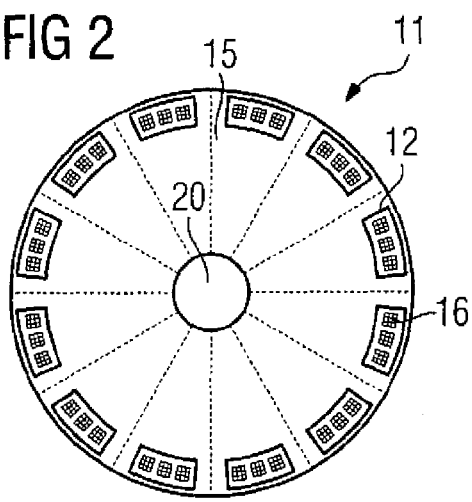
FIG. 2 shows a first refinement of a primary part in the form of a disk.

FIG. 2 shows a primary part 11 in the form of a disk, which has a mounting plate or else a base plate 15. A plurality of curved primary part elements or segments 12 are arranged on the mounting plate 15. By way of example, twelve primary part elements 12 are arranged in the exemplary embodiment shown in FIG. 2. Each primary part element 12 has a separate three-phase winding 16 which, in particular, is formed by means of tooth-wound coils, also referred to as field coils. According to FIG. 2, the maximum number of primary part segments 12 corresponding to the disk radius is arranged on the mounting plate 15. However, it is also possible to arrange straight primary part segments instead of the curved primary part segments 12, such as those known from conventional linear motors. The cutout 20 can be seen in the centre of the primary part 11, allowing the primary part 11 to be arranged on a shaft.

Figure 3:
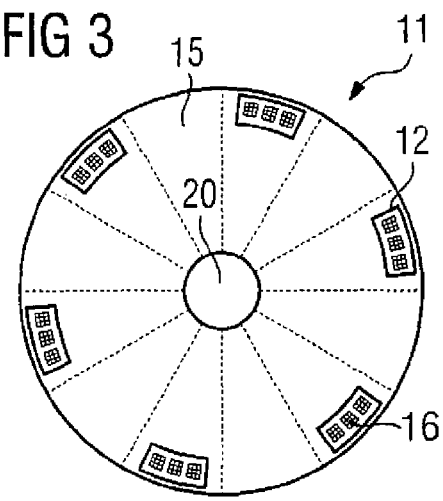
FIG. 3 shows a second refinement of a primary part in the form of a disk.

FIG. 3 shows a further refinement for a primary part 11. As can be seen from FIG. 3, a smaller number of primary part segments or primary part elements 12 are arranged on the mounting plate 15. By way of example, according to the exemplary embodiment shown in FIG. 3, six primary part elements 12 are arranged, such that, in contrast to FIG. 2, half the maximum number of possible primary part elements 12 corresponding to the disk radius is provided. Thus, in contrast to FIG. 2, the torque which can be produced or the power which can be produced is reduced by about 50%. The use of individual primary part elements 12 therefore makes it possible to vary the number of primary part elements 12 depending on the desired power density and the desired torque.

Figure 4:
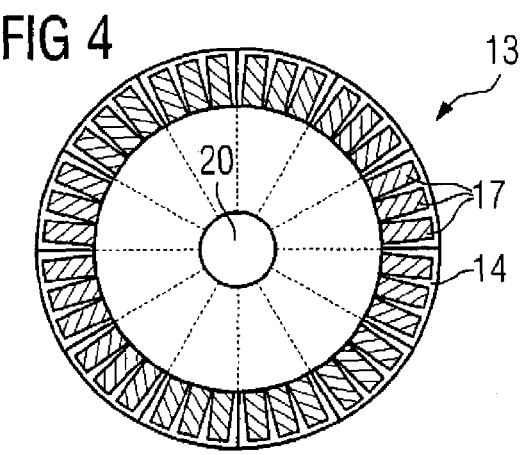
FIG. 4 shows a refinement of a secondary part in the form of a disk.

FIG. 4 shows one embodiment of a secondary part 13. The secondary part 13 has a plurality of secondary part elements 14. A total of twelve secondary part elements 14 can be seen. Joined to one another, the secondary part elements 14 form a ring or a circle. It is worthwhile using the secondary part elements 14 to form, as far as possible, a closed ring or circle. Otherwise, this would result in an undesirably high cogging torque because of the excessively large distances between the secondary part elements 14. On the one hand, the secondary part elements 14 can likewise be arranged on a mounting plate. Alternatively, a ring formed by the secondary part elements 14 can be supported by means of struts or rods on a bearing (not shown) on the cutout 20.

Each secondary part element 14 has, for example, three permanent magnets 17, in which case each permanent magnet 17 may be formed from one or more parts. Each permanent magnet 17 has a cuboid shape, and the permanent magnets 17 are arranged at a specific angle to one another, in particular so as to simulate a circular arrangement.

FIG. 5 shows a first refinement of a machine link of the electrical roller drive 10 to a roller 3. The roller 3 is arranged on a drive shaft 3a. The electrical roller drive 10 is in the form of a disk-type motor and has the primary part 11 in the form of a disk and the secondary part 13 in the form of a disk, which are separated from one another by an air gap 19 which is in the form of a disk or ring. The electromagnetic forces and fields act in the axial direction parallel to the drive shaft 3a, between the primary part 11 and the secondary part 13. Permanent magnets 17 are arranged on the secondary part 13, and primary part elements 12 are arranged on the primary part 11.

The secondary part 13 is in the form of a moving component, that is to say a rotor, and is directly connected to the roller 3, that is to say it is arranged directly on an end face of the roller 3. By way of example, the secondary part 13 may be attached to the roller by an interlock a force fit or an integral joint. By way of example, the secondary part 13 is screwed on, or is welded or adhesively bonded to the roller 3. An arrangement of the secondary part 13 on the roller 3 such as this results in the torque being transmitted directly to the roller 3. The primary part 11 is in the form of a stationary part, that is to say a stator, and is arranged on the shaft 3a. The primary part 11 is arranged by means of a bearing 18 which, for example, may be in the form of a roller bearing or a slide bearing. The stationary primary part 11 can be mounted on a further stationary component, although this is not shown. By way of example, the primary part can be linked to a housing part of a production machine by means of torque supports.

FIG. 6 shows a further refinement of a machine link of an electrical roller drive 10 to a roller 3. According to this embodiment, two electrical drives 10 are in practice arranged on the shaft 3a. Two primary parts 11 and two secondary parts 13 are arranged axially alongside one another. This doubles the torque which is transmitted to the drive shaft 3a of the roller 3. Depending on the desired power and the desired torque, any desired number of disk-type motors can be arranged as electrical drives.

FIG. 7 shows a further embodiment of an arrangement of an electrical roller drive 10. According to this embodiment, the electrical drive 10 is in the form of a so-called double-comb arrangement. A primary part 11 is arranged on the shaft 3a, with primary part elements 12 being arranged on each side of the mounting plate 15. A secondary part 13 is arranged on each of the two sides of the primary part 11, and the secondary parts 13 are mounted in a stationary manner on a housing or a machine structure.

It is likewise possible for one secondary part 13 to be fitted with secondary part elements 14 on both sides, and to be firmly connected to the drive shaft 3a. Corresponding fitted primary parts 11 on both sides of the secondary part 13 are connected to a machine structure in a stationary manner with respect to the secondary part 13 via a housing which connects the two primary parts 11.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electrical roller drive for connection to a roller, comprising a disk-type motor which includes a plurality of disk-shaped primary parts and a plurality of disk-shaped secondary parts arranged in spaced-apart relation to the primary parts such as to define an air gap between each of the secondary parts and a neighboring one of the primary parts to thereby enable a variable adjustment of a torque of the roller drive upon the roller, wherein each of the primary parts has a plurality of primary part elements, with each primary part element having a single-phase or polyphase winding.

2. The electrical roller drive of claim 1, wherein one member selected from the group consisting of the secondary parts and the primary parts is arranged directly on the roller.

3. The electrical roller drive of claim 1, wherein one member selected from the group consisting of the secondary parts and the primary parts is arranged on a drive shaft of the roller.

4. The electrical roller drive of claim 1, wherein each of the secondary parts has a plurality of curved secondary part elements.

5. The electrical roller drive of claim 1, wherein each of the secondary parts has a plurality of straight secondary part elements have a straight configuration.

6. The electrical roller drive of claim 5, wherein the secondary part elements have a predeterminable number of cuboid permanent magnets.

7. The electrical roller drive of claim 1, wherein the primary part elements have a curved configuration.

8. The electrical roller drive of claim 1, wherein the primary part elements have a straight configuration.

9. The electrical roller drive of claim 1, wherein the air gap extends at a right angle to the driven roller.

10. The electrical roller drive of claim 1 for operating a production machine.

11. The electrical roller drive of claim 10, wherein the production machine is a continuous press for wood materials.

* * * * *